United States Patent [19]

Walller

[11] Patent Number: 5,136,689
[45] Date of Patent: Aug. 4, 1992

[54] METHOD AND APPARATUS FOR INCREMENTAL COMPUTATION OF A LINEAR FUNCTION

[75] Inventor: William G. Walller, Wilsonville, Oreg.

[73] Assignee: Tektronix, Inc., Wilsonville, Oreg.

[21] Appl. No.: 384,081

[22] Filed: Jul. 24, 1989

Related U.S. Application Data

[63] Continuation of Ser. No. 79,622, Jul. 30, 1987, abandoned.

[51] Int. Cl.$^5$ ............................................. G06F 15/20
[52] U.S. Cl. ................................................... 395/143
[58] Field of Search ................................ 364/518–522; 340/721, 723; 324/121 R; 395/143

[56] References Cited

U.S. PATENT DOCUMENTS 4,580,236 4/1986 Tsujioka et al. ............... 364/521 X Primary Examiner—H. A. Herndon
Attorney, Agent, or Firm—John Smith-Hill

[57] ABSTRACT

A determination as to whether the linear change in a dependent variable $Y=(Dy/Dx)*X$ resulting from an ith step change of magnitude dx in an independent variable X would be better approximated by a change $m*dy$ or a change $(m+1)*dy$ in the dependent variable, is made by
(a) setting m equal to floor (Dy/abs(Dx)), setting r equal to (Dy/abs(Dx))−m, setting DirX equal to Dx/abs)Dx), and setting Er equal to r−0.5; and
(b) for each value of i in the range from 1 to (Dx/dx)−1, determining whether Er is less than 0 and, if so, setting Er equal to Er+r, X equal to X+DirX*dx and Y equal to Y+m*dy, and otherwise setting Er equal to Er+r−1, X equal to X+DirX*dx and Y equal to Y+(m+1)*dy.

5 Claims, 2 Drawing Sheets

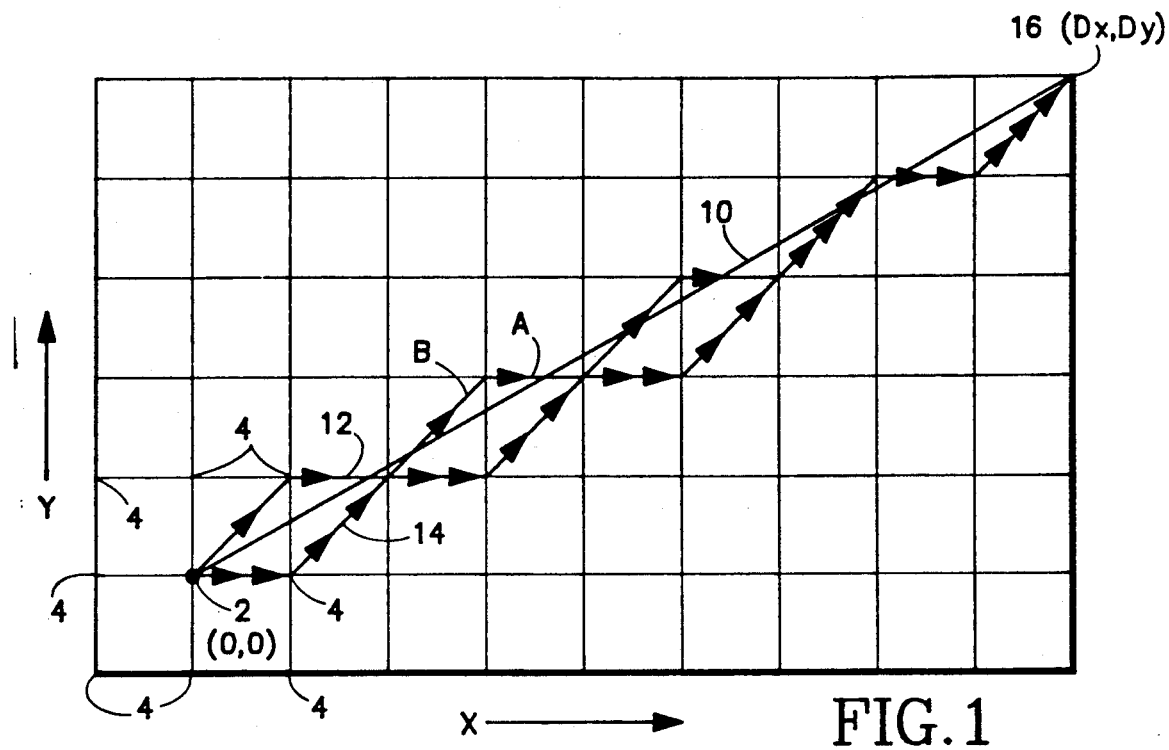
FIG.1
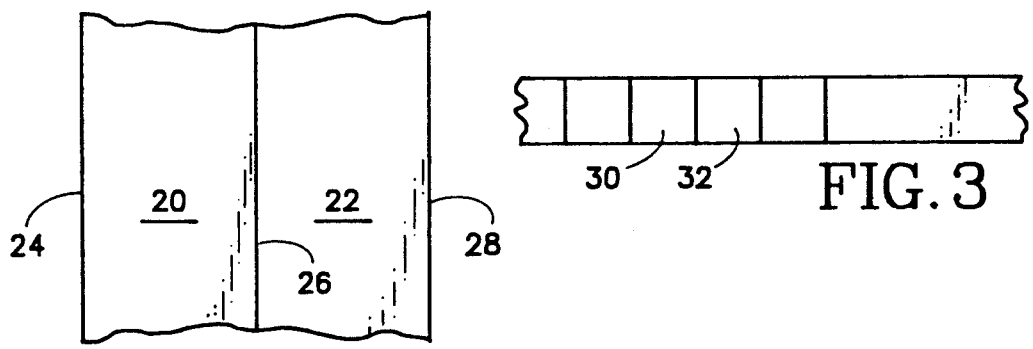
FIG.2
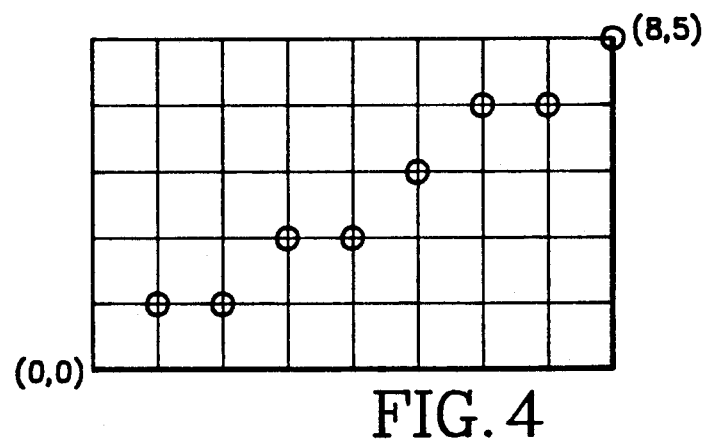
FIG.3
FIG.4

METHOD AND APPARATUS FOR INCREMENTAL COMPUTATION OF A LINEAR FUNCTION

This is a continuation of application of Ser. No. 079,622 filed Jul. 30, 1987 and now abandoned.

BACKGROUND OF THE INVENTION

This invention relates to an improved method and apparatus for incremental computation of a linear function.

A known digital plotter has a print head which is used to apply a print medium, such as ink, to a record medium, such as paper. The record medium is held stationary relative to a support frame. The print head is mounted on a carriage which is movable along a guide structure in directions along a first axis under control of a first motor. The guide structure is movable relative to the support frame in directions parallel to a second axis (which is perpendicular to the first axis) under control of a second motor. The print head is able to apply print medium to the record medium only at discrete, equally-spaced locations along the first and second axes. The locations to which print medium may be applied thus form a square mesh. As shown in FIG. 1, in which the first and second axes are designated X and Y, the print head may be moved from a starting position, in which it is able to apply a dot to a mesh point 2 having coordinates (0,0), in any one of eight directions such that it arrives at a new position in which it is able to apply a dot to a mesh point 4 having coordinates (X1,Y1) where either X1 or Y1 has an absolute value of 1 and the other coordinate is $-1$, 0 or $+1$. Such a plotter is referred to hereinafter as a plotter of the aforesaid kind. In a plotter of the aforesaid kind, the movement of the print head along one axis is independent of its movement along the other axis.

A plotter of the aforesaid kind may be used to simulate a straight line at an arbitrary orientation by applying dots of print medium to the record medium at appropriately selected mesh points. Each two adjacent dots form a line segment, and in general the straight line is simulated by writing a succession of line segments in which each line segment is either parallel to a selected one of the first and second axes or is parallel to a selected diagonal to the first and second axes. As shown in FIG. 1, the line 10 from the point 2 to the point 16 having coordinates (Dx, Dy) is created by writing line segments A that are parallel to the X axis and line segments B that are parallel to the diagonal at $+45°$ to the positive X direction. No other line segments are needed to simulate the straight line.

When a plotter of the aforesaid kind is used in this manner to simulate a line, it is necessary to be able to determine rapidly whether the next line segment should be along one of the first and second axes or diagonal to the first and second axes. FIG. 1 shows that a better simulation of the line 10 is provided by selecting the path 12, indicated by single arrows, than by selecting the path 14, indicated by double arrows.

J. E. Bresenham, Algorithm for Computer Control of a Digital Plotter, IBM Systems Journal, Vol. 4, 25 (1965), describes an algorithm which enables a plotter of the aforesaid kind to select a path that provides a good simulation of a straight line without its being necessary to carry out a multiplication or division operation.

Using the teaching of Bresenham, but with different notation, we can consider the case of representing the line drawn from (0,0) to (DxDy) in FIG 1. Bresenham's algorithm solves the case for the first octant, where $Dx > = Dy > = 0$ and $Dx > 0$. A line in the first octant is simulated by writing line segments along the X axis (0° in polar coordinates) and line segments along the diagonal at $+45°$. The algorithm minimizes the vertical error between the line and the points chosen to represent it. The equation of the line that is to be approximated is $Yt = (Dy/Dx)*X$. Yt, the "true" value of Y, is a function of X which we write explicitly as:

$$Yt(X) = (Dy/Dx)*X$$

For integer values of X, the algorithm chooses an integer value Ya to approximate Yt. The vertical error in this approximation is $Ev(X) = Ya(X) - Yt(X)$. Because Ya is restricted to be an integer, we see that the optimal value of Ya obeys the condition $abs[Ev(X)] < = \frac{1}{2}$. If $Yt(X) = n + (\frac{1}{2})$ for some integer n, then there are two equally optimal approximations, namely $Ya(X) = n$ and $Ya(X) = n + 1$. To create a unique value of Ya for all X, we make the more restrictive requirement that one of the following two inequalities must hold:

$$-(1/2) < Ev(X) < = +(1/2) \quad (X = 0, \ldots, Dx) \quad [1.1A]$$

or $$-(1/2) < = Ev(X) < +(1/2) \quad (X = 0, \ldots, Dx). \quad [1.1B]$$

Bresenham's algorithm obeys [1.1A].

The algorithm involves an incremental calculation along the X axis. Therefore given Ya(X), Ev(X), Dx and Dy, we want to calculate Ya(X+1). To facilitate further generalizations, let us define $$X' = X + 1 \quad [1.2]$$

We have from the definition of Ev, the relation $$\begin{aligned}Ev(X') - Ev(X) &= [Ya(X') - Ya(X)] - [Yt(X') - Yt(X)] \quad [1.3]\\ &= [Ya(X') - Ya(X)] - [(Dy/Dx)*(X+1) - (Dy/Dx*X)]\\ &= [Ya(X') - Ya(X)] - (Dy/Dx).\end{aligned}$$

From [1.3] we have $$Ev(X') = Ev(X) - (Dy/Dx) + [Ya(X') - Ya(X)].$$

Applying [1.1A] to this equation gives $$-(\tfrac{1}{2}) < Ev(X) - (Dy/Dx) + [Ya(X') - Ya(X)] < = +(\tfrac{1}{2}),$$

which produces the two relationships $$Ya(X') - Ya(X) > -Ev(X) + (Dy/Dx) - (\tfrac{1}{2}) \quad [1.4A]$$

$$Ya(X') - Ya(X) < = -Ev(X) + (Dy/Dx) + (\tfrac{1}{2}) \quad [1.4B]$$

Using the inequalities $(Dy/Dx) > = 0$ and $-Ev(X) > = -(\tfrac{1}{2})$ in [1.4A] gives $$Ya(X') - Ya(X) > -(1.2) + 0 - (\tfrac{1}{2})$$

$$Ya(X') - Ya(X) > -1. \quad [1.5]$$

Using the inequalities $(Dy/Dx) <= 1$ and $-Ev(X) < (\frac{1}{2})$ in [1.4B] gives $$Ya(X') - Ya(X) < (\frac{1}{2}) + 1 + 1(\frac{1}{2}),$$

$$Ya(X') - Ya(X) < 2. \qquad [1.6]$$

Since Ya(X) and Ya(X') are integers, one of the following two conditions must be true:

$$Ya(X') - Ya(X) = 0 \qquad [1.7A]$$

or $$Ya(X') - Ya(X) = 1 \qquad [1.7B]$$

[1.7A] represents a horizontal juxtaposition of the pixels (X,Y(X)) and (X',Y(X')) while [1.7B] represents a diagonal juxtaposition of these pixels. We call [1.7A] a Horizontal Draw and [1.7B] a Diagonal Draw.

If we have the condition $$-Ev(X) + (Dy/Dx) - (\tfrac{1}{2}) >= 0 \qquad [1.8]$$

then from [1.4A] we see that $Ya(X') - Ya(X) > 0$. From this it follows that [1.7A] cannot hold so that [1.7B] must be true, that is $Ya(X') = Ya(X) + 1$. If we have the condition $$-Ev(X) + (Dy/Dx) + (\tfrac{1}{2}) > 1 \qquad [1.9]$$

then from [1.4B] we see that $Ya(X') - Ya(X) < 1$. From this it follows that [1.7B] cannot hold so that [1.7A] must be true, that is $Ya(X') = Ya(X)$. Let us define $$Er(X) = -Ev(X) + (Dy/Dx) - (178). \qquad [1.10]$$

We have determined that the following rule holds:

If $Er(X) >= 0$ then a Diagonal Draw is performed [1.11]
If $Er(X) < 0$ then a Horizontal Draw is performed.

Since these two conditions exhaust the possible values of Er(X), this rule completely determines the algorithm. To initialize the algorithm, we easily see that the optimal value of Ya(0) is 0 so that Ev(0)=0 and $Er(0) = -0 + (Dy/Dx) - (\tfrac{1}{2})$. From [1.3], we see that $$\begin{aligned} Er(X') - Er(X) &= [-Ev(X') + (Dy/Dx) - (1/2)] - \qquad [1.12] \\ &\quad [-Ev(X) + (Dy/Dx) - (1/2] \\ &= -[Ev(X') - Ev(X)] \\ &= (Dy/Dx) - (Ya(X') - Ya(X)). \end{aligned}$$

Thus if a Diagonal Draw is performed, then $$Er(X') = Er(X) + (Dy/Dx) - 1$$

and if a Horizontal Draw is performed, then $$Er(X') = Er(X) + (Dy/Dx).$$

For the first octant, then, the Bresenham algorithm can be written as

```
Er := (Dy/Dx) - 0.5;                        {Algorithm 1.1}
For i := 1 to Dx do
    If Er >=0 then
        Er := Er + (Dy/Dx) - 1;
        Diagonal Draw;
    Else {Er < 0}
        Er := Er + (Dy/Dx);
        Horizontal Draw;
    End-If;
End-for;
```

Multiplying by 2*Dx gives the equivalent integer algorithm

```
Er := 2*Dy - Dx;                            {Algorithm 1.2}
For i := 1 to Dx do
    If Er >=0 then
        Er := Er + 2*Dy - 2*Dx;
        Diagonal Draw;
    Else {Er < 0}
        Er := Er + 2*Dy;
        Horizontal Draw;
    End-If;
End-for;
```

Bresenham's algorithm is restricted to the case in which the line to be simulated is in the first octant. In order to simulate a line that lies in one of the other octants it is necessary to change signs and/or exchange the X and Y axes in the algorithm. When the X and Y axes are exchanged, the vertical error Ev becomes the horizontal error. For all Y ($0 <= Y <= Dy$) where $Dy > 0$, the algorithm chooses an approximation Xa(Y) to the "true" line $Xt(Y) = (Dx/Dy)*Y$. X is then considered to be a function of Y, and it is necessary to carry out one iteration of the algorithm for each value of Y. This can be tolerated in the case of a plotter of the aforesaid kind, precisely because movement of the print head along the second axis is independent of its movement along the first axis.

In a digitally-addressed raster scan CRT, such as might be employed in a computer-aided design (CAD) system, an image is created by selectively illuminating a rectangular array of pixels, adjacent pixels in a horizontal line being addressed consecutively and being illuminated in accordance with a Z-axis control signal. If it is desired to illuminate a first pixel which lies on a first raster line and a second pixel which lies on an adjacent raster line and is either vertically aligned with the first pixel or is adjacent to the first pixel with respect to the horizontal direction, it is necessary to address up to an entire line of pixels between illuminating the first pixel and illuminating the second pixel. If Bresenham's algorithm is used to determine whether a pixel is to be illuminated, and the determination is made concurrently with the creation of the image on the CRT screen, it takes longer to simulate a line that is at less than 45 degrees to the vertical axis than to simulate a line of the same length that is at less than 45 degrees to the horizontal axis.

A CAD system may be used to provide a two-dimensional display of a three-dimensional object. In a simple case, as shown in FIG. 2, the object may have planar surfaces 20 and 22 which are defined between vertical lines 24, 26 and 28. If it is desired to display the object in an orientation such that the line 26 appears closer to the viewer than the line 24 and the line 28 appears closer than the line 26, increased realism may be provided by shading so that the brightness with which the surfaces 20 and 22 are shown increases from left to right of the CRT screen. This is accomplished by increasing the beam current of the CRT in accordance with a known function, e.g. a linear function, as the beam sweeps from left to right between each two vertical lines. In order to provide "real time" presentation of moving three-dimensional objects, it is necessary to calculate the intensity with which each pixel will be illuminated "on the fly". That is, the calculation of the intensity to use for the next adjacent pixel is done at the same time as the current pixel is being illuminated. For example, if the calculation for pixel 30 (FIG. 3) has been completed and pixel 30 is illuminated at the required intensity on field N, the calculation for the adjacent pixel 32 is then carried out and pixel 32 is illuminated at the required intensity on field N+n. In this manner, the surfaces 20 and 22 are filled progressively.

It is desirable that the minimum beam current and the maximum beam current be adjustable independently of each other and that the horizontal distance between each two vertical lines be adjustable. If the beam current is digitally controlled and has, for example, 256 discrete levels between the levels selected for the left and right edges of the surfaces and the CRT has 1024 pixels between the lines 24 and 26 and between the lines 26 and 28, the rate of increase of the beam current from left to right is less than one step per pixel. Several pixels in a given raster line may be illuminated at the same intensity, followed by an increase of one step and then several more pixels may be illuminated at the same, increased intensity. In this case, n might be equal to 1. However, in a practical CAD system there may be as many as 65,536 discrete beam current levels between the level selected for the left edge of the surface 20 or 22 and the level selected for the right edge of the surface, so that adjacent pixels on a given line might be addressed at currents that differ from each other by multiple steps. Under these circumstances, using Bresenham's algorithm to calculate the number of steps by which the current must increase from the pixel 30 to the pixel 32 takes much longer because one iteration of the algorithm is required for each current level and n may be substantially greater than 1. If there are fewer than 1024 discrete current levels between the levels selected for the lines 24 and 26 and more than 1024 levels between the levels selected for the lines 26 and 28, it will take longer to fill the area 22 than the area 20. This difference in the rate of fill of different surfaces may be disturbing to the user of the CAD system.

Many CAD systems utilize dedicated microprocessors to carry out the calculations that are required in order to determine which pixels must be illuminated and at what intensity, because microprocessors run more rapidly than other processors and therefore are potentially able to complete the calculations more quickly than other processors. A disadvantage of microprocessors is that they have relatively unsophisticated instruction sets, and are not able to carry out such complex operations as a processor with a more extensive instruction set. Bresenham's algorithm is in principle well suited to use with microprocessor-based CAD systems because it does not require repeated multiplication or division operations. However, the above-described disadvantage of Bresenham's algorithm has previously prevented widespread use of the algorithm in microprocessor-based CAD systems for providing a two-dimensional display of a three-dimensional object.

SUMMARY OF THE INVENTION

In an embodiment of the invention, Bresenham's algorithm is modified so that it is not necessary to change signs and/or exchange axes in order to simulate a linear change in an octant other than the first. In accordance with the invention, a method of determining whether the linear change in a dependent variable Y=(-Dy/Dx)*X resulting from an with step change of magnitude dx in an independent variable X would be better approximated by a change m*dy or a change (m+1)*dy in the dependent variable comprises:

(a) setting m equal to floor (Dy/abs(Dx)), setting r equal to (Dy/abs(Dx))−m, setting DirX equal to (Dx/abs(Dx), and setting Er equal to r−0.5; and (b) for each value of i in the range from 1 to (Dx/dx)−1, determining whether Er is less than 0 and, if so, setting Er equal to Er+r, X equal to X+DirX*dx and Y equal to Y+m*dy, and otherwise setting Er equal to Er+r−1, X equal to X+DirX*dx and Y equal to Y+(m+1)*dy.

BRIEF DESCRIPTION OF THE DRAWINGS

For a better understanding of the invention, and to show how the same may be carried into effect, reference will now be made, by way of example, to the accompanying drawings in which:

FIG. 1 illustrates a portion of the record medium used in a digital plotter of the aforesaid kind, FIG. 2 illustrates a portion of the screen of a CAD system, FIG. 3 illustrates pixels on a raster line, FIGS. 4 and 5 are graphs illustrating applications of the invention.

DETAILED DESCRIPTION

Figure 6:
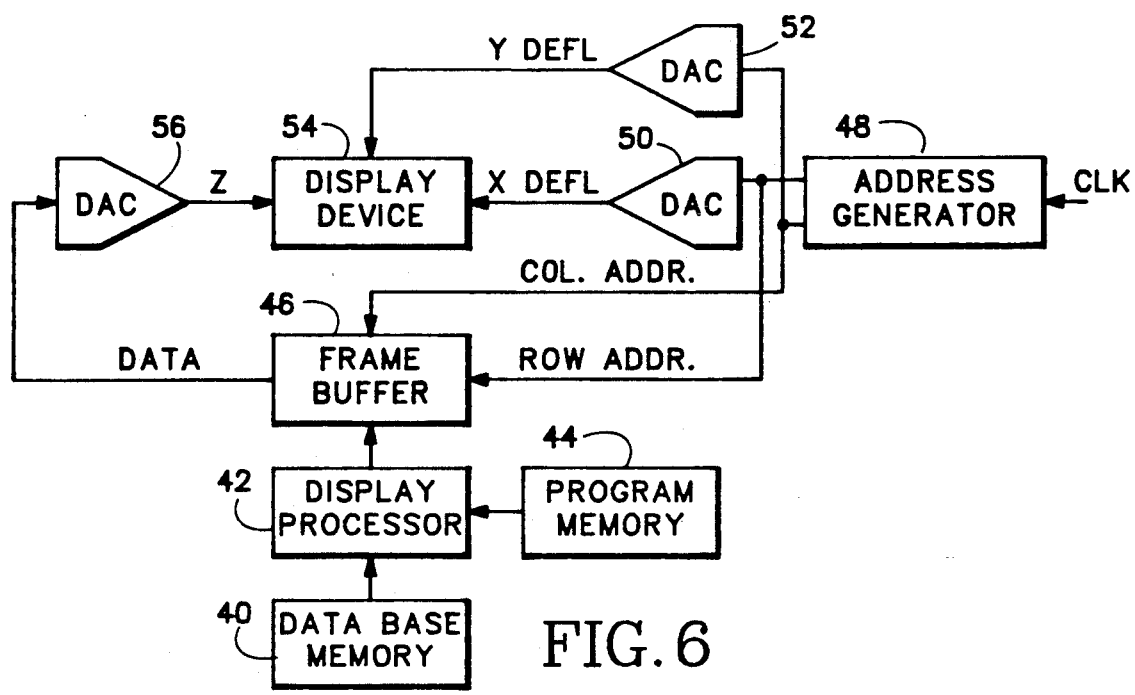
FIG. 6 is a simplified block diagram of the display portion of a CAD system.

Bresenham's algorithm may be modified so that Y is always a function of X.

Let m = floor(Dy/abs(Dx))  [2.1]

Let r = (Dy/abs(Dx))−m.  [2.2]

The floor operator applied to a number generates the greatest integer not exceeding the number. Thus, floor 1.2=1, floor 2.0=2, and floor −1.2=−2. (Similarly, the ceiling operator, which is used below, applied to a number generates the smallest integer not exceeded by the number: ceiling 1.2=2, ceiling 2.0=2, and ceiling −1.2=−1.)

If $Dx > 0$ then  [2.3]
m = floor(Dy/Dx) (Dx > 0)

so that m*Dx <= Dy for Dy positive, zero or negative, and r = (Dy/Dx) − m (Dx > 0)  [2.4]

so that r=(Dy/Dx)−floor(Dy/Dx) which implies that $0 <= r < 1$.

If $Dx < 0$ then
m = floor(Dy/(−Dx) = floor(−[Dy/Dx]),
m = −ceiling(Dy/Dx) (Dx < 0)  [2.5]

so that (−m)*Dx >= Dy for Dy positive, zero or negative, and $$r = -m - (Dy/Dx), (Dx < 0) \quad [2.6]$$

so that r=ceiling (Dy/Dx)−(Dy/Dx) which again implies that $0 <= r < 1$. Therefore, in general we have $$0 <= r < 1. \quad [2.7]$$

From [2.4] and [2.6] we have $$\begin{aligned} Dy/Dx &= m + r \, (Dx > 0) \\ &= -m - r \, (Dx < 0). \end{aligned} \quad [2.8]$$

We define $$\begin{aligned} X' &= X + 1 \, (Dx > 0) \\ X' &= X - 1 \, (Dx < 0). \end{aligned} \quad [2.9]$$

This gives us the relation
$$(Dy/Dx) = (X' - X)*(m+r) \quad [2.10]$$

We still assume that [1.1A] holds. We have $$\begin{aligned} Ev(X') - Ev(X) &= [Ya(X') - Ya(X)] - [Yt(X') - Yt(X)] \\ &= [Ya(X') - Ya(X)] - [(Dy/Dx)*(X' - X)] \\ &= [Ya(X') - Ya(X)] - \\ &\quad [X' - X)*(X' - X)]*(m + r) \\ &= [Ya(X') - Ya(X)] - m - r, \end{aligned} \quad [2.11]$$

where we have used the fact that $(X'-X)*(X'-X)=1$ for all X. Using [1.1A] and [2.1] gives $$-(1/2) < Ev(X') = Ev(X) + [Ya(X')-Ya(X)] - m - r <= +(1/2)$$

which forms the two inequalities $$Ya(X') - Ya(X) > -Ev(X) + m + r - (1/2) \quad [2.12A]$$

$$Ya(X+') - Ya(X) <= -Ev(X) + m + r + (1/2). \quad [2.12B]$$

From [1.1A] we have $-(1/2) < Ev(X) <= (1/2)$ or that $-(1/2) <= -Ev(X) < (1/2)$. Using the fact that $r >= 0$ and $-Ev(X) >= -(1/2)$ in [2.12A] gives $$\begin{aligned} Ya(X') - Ya(X) &< (1/2) + m + 1 + (1/2), \\ Ya(X') - Ya(X) &> m - 1. \end{aligned} \quad [2.13]$$

Using the fact that $r<1$ and $-Ev(X)<(1/2)$ in [2.12B] gives $$\begin{aligned} Ya(X') - Ya(X) &< (1/2) + m + 1 + (1/2), \\ Ya(X') - Ya(X) &< m + 2. \end{aligned} \quad [2.14]$$

Since Ya(X) and Ya(X') are integers, one of the following two conditions must be true:

$$Ya(X') - Ya(X) = m \quad [2.15A]$$
or
$$Ya(X') - Ya(X) = m + 1. \quad [2.15B]$$

Let UP(m) represent the change in Ya given by [2.15A]. Then UP(m+1) will represent the change in Ya given by [2.15B]. If we have the condition $$-Ev(X)+m+r-(1/2)>=m,$$

then from [2.12A] we see that $Ya(X')-Ya(X)>m$. From this it follows that [2.15A] cannot hold so that [2.15B] must be true, that is $Ya(X')=Ya(X)+m+1$. If we have the condition $$-Ev(X)+m+r+(1/2)<m+1,$$

then from [2.12B] we see that $Ya(X')-Ya(X)<m+1$. From this it follows that [2.15B] cannot hold so that [2.15A] must be true, that is $Ya(X')=Ya(X)+m$.

Let us define $$Er(X) = -Ev(X) + r - (1/2). \quad [2.16]$$

We have determined that the following rule holds:

If $Er(X) >= 0$ then $UP(m + 1)$ is performed  [2.17]
If $Er(X) < 0$ then $UP(m)$ is performed.

Since these two conditions exhaust the possible values of Er(X), this rule completely determines the algorithm. To initialize the algorithm, we again see that the optimal value of Ya(0) is 0 so that Ev(0)=0 and $Er(0)=-0+r-(1/2)$. From [2.11], we see that $$\begin{aligned} Er(X') - Er(X) &= [-Ev(X') + r - (1/2)] - \\ &\quad [-Ev(X) + r - (1/2)] \\ &= -[Ev(X') - Ev(X)] \\ &= m + r - [Ya(X') - Ya(X)]. \end{aligned}$$

Thus if UP(m+1) is performed, then $$Er(X') = Er(X) + r - 1$$

and if UP(m) is performed, then $$Er(X') = Er(X) + r.$$

The generalized algorithm can be written as

```
m := floor(Dy/abs(Dx));                    [Algorithm 2.1]
r := (Dy/abs(Dx)) - m;
DirX := sign(Dx); {i.e. Dx/abs(Dx)}
Er := r - 0.5;
For i := 1 to abs(Dx) do
    If Er >=0 then
        Er := Er + r - 1;
        X := X+DirX ; Y := Y + m + 1;
    Else {Er < 0}
        Er := Er + r;
        X := X+DirX ; Y := Y + m;
    End-If;
End-For;
```

Multiplying by 2*abs(Dx) gives the equivalent generalized integer algorithm

```
m := floor(Dy/abs(Dx));                    [Algorithm 2.2]
R := Dy - m*abs(Dx);
DirX := sign(Dx);
Er := 2*R - abs(Dx) ;
For i := 1 to abs(Dx) do
    If Er >=0 then
        Er := Er + 2*R - 2*abs(Dx);
        X := X+DirX ; Y := Y + m +1;
    Else {Er < 0}
        Er := Er + 2*R;
        X := X+DirX ; Y := Y + m;
    End-If;
```

-continued

Figure 5:
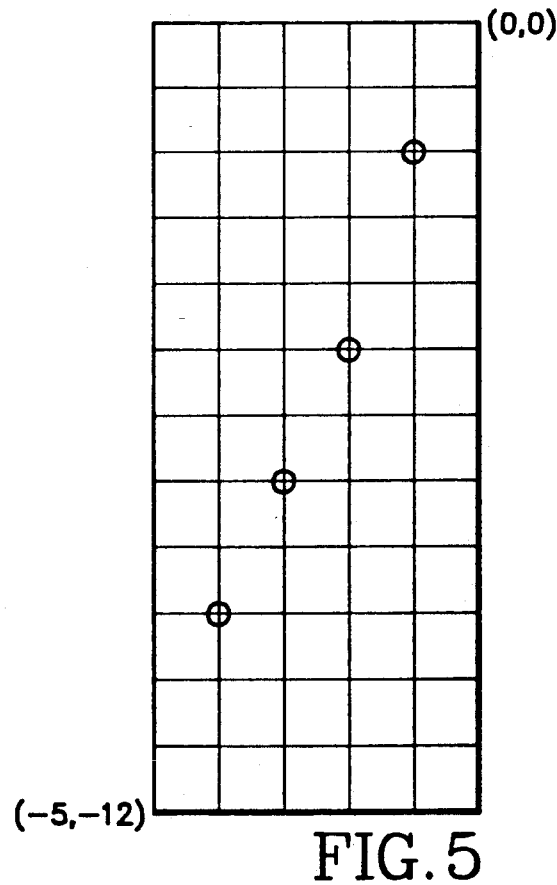

End-For;

Application of the modified algorithm will now be described with reference to FIGS. 4 and 5, which illustrate respectively a line in the first octant and a line in the sixth octant.

In the case of FIG. 4:

```
Dx = +8
Dy = +5
m = floor(5/8) = 0
r = 5/8 - 0 = 5/8
DirX = 1
Er = 1/8
For i = 1, Er >= 0
  Er = 1/8 + 5/8 - 1 = -1/4
  X = 0 + 1 = 1
  Y = 0 + 0 + 1 = 1
For i = 2, Er < 0
  Er = -1/4 + 5/8 = 3/8
  X = 1 + 1 = 2
  Y = 1 + 0 = 1
For i = 3, Er >= 0
  Er = 3/8 + 5/8 - 1 = 0
  X = 2 + 1 = 3
  Y = 1 + 0 + 1 = 2
```

In similar fashion, it can be shown that

| for i = | x = | Y = |
|---|---|---|
| 4 | 4 | 2 |
| 5 | 5 | 3 |
| 6 | 6 | 4 |
| 7 | 7 | 4 |
| 8 | 8 | 5 |

These coordinates are plotted in FIG. 4.
In the case of FIG. 5,

```
Dx = -5
Dy = -12
m = floor(-12/5) = -3
r = (-12/5) - (-3) = 3/5
DirX = -1
Er = 1/10
For i = 1, Er >= 0
  Er = 1/10 + 3/5 - 1 = -3/10
  X = 0 - 1 = -1
  Y = 0 - 3 + 1 = -2
For i = 2, Er < 0
  Er = -3/10 + 3/5 = 3/10
  X = -1 - 1 = -2
  Y = -2 - 3 = -5
For i = 3, Er >= 0
  Er = 3/10 + 3/5 - 1 = -1/10
  X = -2 - 1 = -3
  Y = -5 - 3 + 1 = -7
Similarly,
for i = 4, X = -4, Y = -9
    i = 5, X = -5, Y = -12
```

It will thus be seen that the modified form of Bresenham's algorithm allows Y to be calculated for each value of X in a signal iteration, regardless of the relationship between abs(Dx) and abs(Dy), without need for repeated multiplication or division. Thus, when applied to calculate the number of steps by which the beam current of a raster scan CRT must change from one pixel of a raster line to the next pixel in order to simulate a shaded surface, the time required to carry out the calculation is not dependent on the result of the calculation. Similarly, when applied to determine which pixels of a digitally-addressed raster scan CRT should be illuminated in order to simulate a straight line, the time required to complete the determination is not dependent on the orientation of the line. These qualities make the modified Bresenham algorithm particularly suited for micro-processor-based CAD systems.

The described method may be implemented using a CAD system having a display portion as shown in FIG. 6. Data representing a three-dimensional object is stored in a data base memory 40, and a display processor 42 acts on that data in accordance with programs stored in a program memory 44 in order to generate a two-dimensional virtual image of the object in the address space of frame buffer 46. Addressing of the frame buffer is controlled by an address generator 48 which receives clock pulses and generates row and column address words. The virtual image is loaded into the frame buffer under control of the row and column address words. The row and column address words are used to read the contents of the frame buffer and are simultaneously applied to digital-to-analog converters (DACs) 50 and 52 for generating X and Y deflection signals which are used to control deflection of the electron beam of a raster scan CRT 54. The data output signal provided by the frame buffer is applied to a third DAC 56 which provides a Z-axis control signal to the CRT 54. A bit-mapped representation of the contents of the frame buffer is thereby created. The programs stored in the program memory 44 utilize the modified form of Bresenham's algorithm to determine which pixels should be illuminated in order to simulate a straight line and the manner in which the beam current must change from pixel to pixel along a raster line in order to simulate a shaded surface.

It will be understood that the foregoing description of FIG. 6 discusses only those elements of a CAD system which are necessary to an understanding of the manner in which the modified form of Bresenham's algorithm may be used in the context of a CAD system. The detailed manner of operation of a practical CAD system has not been described, because it is well understood by those skilled in the art.

It will be appreciated that the present invention is not restricted to the particular embodiment that has been described and illustrated, and that variations may be made therein without departing from the scope of the invention as defined in the appended claims and equivalents thereof.

I claim:

1. A method of operating an imaging device having a rectangular array of addressable pixels at a uniform pitch dx along an X axis and a uniform pitch dy along a Y axis, so as to display a simulated straight line from a pixel at a location (X1, Y1) to a pixel at a location (X2, Y2), by stimulating consecutively N pixels which are adjacent one another in the X direction, where N=(X2−X1)/dx said method comprising:
   (a) setting m equal to floor ((Y2-Y1)/abs(X2-X1)), setting r=((Y2−Y1)/abs(X2−X1))−m, setting DirX=(X2−X1)/(abs(X2−X1), and setting Er=r−0.5; and
   (b) for each value of i in the range from 1 to N−1, illuminating the pixels at the positions (X,Y), (X, Y+dy), . . . (X, Y+(m−1)*dy), determining whether Er is less than 0 and, if so, setting Er=Er+r and illuminating the pixel at (X+DirX*dx, Y+m*dy), and otherwise setting Er=Er+r−1 and illuminating the pixels at (X, Y+m*dy) and (X+DirX*dx, Y+(m+1)*dy).

2. A method of operating an imaging device having at least one row of N pixels at a uniform pitch dx along an X axis, each pixel being susceptible to stimulation so that it is able to emit light at an intensity Y which is equal Y1+n*dy, where n is an integer, so as to simulate a change in intensity in accordance with the function Y=((Y2−Y1)/(X2−X1))*X, where (X2−X1)/dx=N, comprising:
   (a) setting m equal to floor ((Y2−Y1)/abs(X2−X1)), setting r=((Y2−Y1)/abs(X2−X1))−m, and setting Er=r−0.5; and
   (b) for each value of i in the range from 1 to N−1, determining whether Er is less than 0 and, if so, setting Er=Er+r and stimulating the ith pixel so as to emit light at intensity (Y1+m*dy), and otherwise setting Er=Er+r−1 and stimulating the with pixel as to emit light at intensity (Y1+(m+1)*dy).

3. Display apparatus comprising:
   an imaging device having at least one row of N pixels at a uniform pitch dx along an X axis, each pixel being susceptible to stimulation at a level Z which is equal Z1+n*dz, where n is an integer, for emitting light at an intensity which is dependent on Z, and
   means for operating the imaging device so as to control the value of Z in a manner such as to simulate a change in stimulation level in accordance with the function Z=((Z2−Z1)/(X2−X1))*X, where (X2−X1)/dx=N, by a method comprising:
   (a) setting m equal to floor ((Z2−Z1)/abs(X2−X1)), setting r=((Z2−Z1)/abs(X2−X1))−m, and setting
   (b) for each value of i in the range from 1 to N−1, determining whether Er is less than 0 and, if so, setting Er=Er+r and stimulating the ith pixel at a level (Z1+m*dz), and otherwise setting Er=Er+r−1 and stimulating the ith pixel at a level (Z1+(m+1)*dz).

4. Display apparatus according to claim 3, wherein the imaging device has a rectangular array of pixels, the pixels being at a uniform pitch dy along a Y axis which is perpendicular to the X axis, and the apparatus comprises:
   means for operating the imaging device so as to display a simulated straight line from a pixel at a location (X1, Y1) to a pixel at a location (X2, Y2), by stimulating consecutively M pixels which are adjacent one another in the X direction, where M=(X2−X1)/dx by
   (a) setting m' equal to floor ((Y2−Y1)/abs(X2−X1)), setting r'=((Y2−Y1)/abs(X2−X1))−m', and setting Er'=r'−0.5; and
   (b) for each value of j in the range from 1 to M−1, illuminating the pixels at the positions (X, Y), (X, Y+dy), . . . (X, Y+(m'−1)*dy), determining whether Er' is less than 0 and, if so, setting Er'=Er'+r' and illuminating the pixel at (X+DirX*dx, Y+m'*dy), and otherwise setting Er'=Er'+r'−1 and illuminating the pixels at (X, Y+m'*dy) and (X+DirX*dx, Y+(m'+1)*dy).

5. Display apparatus comprising:
   an imaging device having a rectangular array of pixels, the pixels being at a uniform pitch dx along an X axis and at a uniform pitch dy along a Y axis which is perpendicular to the X axis, and
   means for operating the imaging device so as to display a simulated straight line from a pixel at a location (X1, Y1) to a pixel at a location (X2, Y2), by stimulating consecutively M pixels which are adjacent one another in the X direction, where M=(X2−X1)/dx by
   (a) setting m'equal to prior ((Y2−Y1)/abs(X2−X1)), setting r'=((Y2−Y1)/abs(X2−X1))−m', and setting Er'=r'−0.5; and
   (b) for each value of j in the range from 1 to M−1, illuminating the pixels at the positions (X, Y), (X, Y+dy), . . . (X, Y+(m'−1)*dy), determining whether Er' is less than 0 and, if so, setting Er'=Er'r'and illuminating the pixel at (X+DirX*dx, Y+m'*dy), and otherwise setting Er'=Er'+r'−1 and illuminating the pixels at (X, Y+m'*dy) and (X+DirX*dx, Y+(M'+1)*dy).

* * * * *

UNITED STATES PATENT AND TRADEMARK OFFICE
CERTIFICATE OF CORRECTION

PATENT NO. : 5,136,689
DATED : August 4, 1992
INVENTOR(S) : William G. Waller

It is certified that error appears in the above-indentified patent and that said Letters Patent is hereby corrected as shown below:

On the title page: Item [75] Inventor should read --William G. Waller --.

Column 11, claim 2, line 18, add "ith" after "stimulating the" and delete "with"

Column 11, claim 3, line 34, add "Er = r - 0.5; and " after "and setting"

Column 12, claim 4, line 8, add ")" after "(X2-X1"

Claim 4   line 31   add comma after "dx"
Claim 4   line 32   add one space after "m'" and change "prior" to "floor"
claim 4   line 39   add "+" after "Er'"

Signed and Sealed this

Eighth Day of February, 1994

Attest:

BRUCE LEHMAN

*Attesting Officer*    *Commissioner of Patents and Trademarks*